(12) United States Patent
Chen

(10) Patent No.: US 7,628,571 B2
(45) Date of Patent: Dec. 8, 2009

(54) TOOL CHUCKING APPARATUS

(75) Inventor: Peter Chen, Taoyuan County (TW)

(73) Assignee: Primetool Mfg. Inc., Taoyuan County (TW)

( * ) Notice: Subject to any disclaimer, the term of this patent is extended or adjusted under 35 U.S.C. 154(b) by 153 days.

(21) Appl. No.: 11/724,285

(22) Filed: Mar. 15, 2007

(65) Prior Publication Data

US 2008/0224425 A1    Sep. 18, 2008

(51) Int. Cl.
    *B23B 31/20* (2006.01)
(52) U.S. Cl. .................. 409/234; 408/240; 279/52
(58) Field of Classification Search ............. 409/232, 409/234; 279/42, 48, 52, 56, 51; 408/238, 408/239 A, 239 R, 240; *B23B 31/20*
    See application file for complete search history.

(56) References Cited

U.S. PATENT DOCUMENTS

| | | | | |
|---|---|---|---|---|
| 2,966,363 | A | * | 12/1960 | Hendrickson ............. 279/52 |
| 3,865,502 | A | * | 2/1975 | Hamann ................. 408/226 |
| 4,710,079 | A | * | 12/1987 | Smith et al. ............. 409/234 |
| 5,064,322 | A | * | 11/1991 | Pisani .................. 409/234 |
| 5,342,155 | A | * | 8/1994 | Harroun ................ 409/131 |

FOREIGN PATENT DOCUMENTS

| | | | |
|---|---|---|---|
| DE | 2831660 A1 | * | 3/1979 |
| DE | 20012246 U1 | * | 3/2001 |
| DE | 19948510 A1 | * | 4/2001 |
| GB | 2004478 A | * | 4/1979 |
| JP | 58071009 A | * | 4/1983 |
| JP | 06023608 A | * | 2/1994 |

* cited by examiner

*Primary Examiner*—Daniel W Howell
(74) *Attorney, Agent, or Firm*—Muncy, Geissler, Olds & Lowe, PLLC

(57) ABSTRACT

A tool chucking apparatus includes a fastening member, a collet, a holding member and an extension member. The fastening member has a first housing space to hold the collet. The collet has pawl structures spaced in an annular manner and formed in a conical structure. The conical structure has a top end directing towards the fastening member. The extension member includes a support portion and an anchor portion coupled together. The support portion has another end tightly coupled with the collet and the fastening member. The anchor portion has another end tightly coupled with the holding member. The support portion is selectable at a desired length specification according to the cutter or tool. The fastening member, collet, holding member and extension member are hollow in the center thereof to form an installation passage after assembly to hold the cutter or tool.

9 Claims, 6 Drawing Sheets

TOOL CHUCKING APPARATUS

FIELD OF THE INVENTION

The present invention relates to a tool chucking apparatus and particularly to a chucking apparatus to hold cutters or tools of varying specifications.

BACKGROUND OF THE INVENTION

These days precision metal machining such as drilling, tapping, boring, milling, cutting of inner or outer diameters or surface grinding usually relies on CNC (Computer Numerical Control) machine tools in cooperation with a plurality of cutters or tools. Those cutters or tools mostly have an elongated stem connecting to a driving spindle of the CNC machine tools through a chucking apparatus or chucking structure. The driving spindle rotates in high speed to drive the cutters or tools held by the chucking apparatus to perform machining on a targeted object.

Hence the holding condition of the chucking apparatus on the cutters or tools directly affects the machining precision of the targeted object. If clamping is not tight enough during high speed rotation of the machining tool idle rotation of the cutters or tools occurs. Referring to FIG. 1, a conventional chucking apparatus mainly includes a fastening member 1, a collet 2 and a holding member 3. The holding member 3 is connected to a driving spindle (not shown in the drawing) of a machining tool, and has a housing space 4 to hold the collet 2 to form a tight coupling. The collet 2 is a hollow conical element and has a plurality of conical pawl structures 5 formed in an annular manner with a center passage 6. The pawl structures 5 are elastic. When a cutter or tool is inserted into the collet 2 the inner diameter of the center passage 6 can be adjusted accordingly. The fastening member 1 and the holding member 3 have respectively a corresponding screw thread 7 and 7' for screwing together to firmly hold the collet 2. In addition, as the collet 2 has the pawl structures 5, when the holding member 3 and the fastening member 1 are screwed together, the pawl structures 5 are forced and shrunk inwards to strengthen coupling of the cutter or tool to increase the firmness of machining and enhance the machining precision of the targeted object.

The collet 2 equipped with the pawl structures 5 to hold the cutter or tool has many advantages, such as can hold cutters or tools of varying sizes and specifications. Moreover, when the holding member 3 and the fastening member 1 are screwed together, they automatically clamp the cutter or tool in an optimal condition. However, the pawl structures 5 can hold only a small portion of cutters or tools. In the event that the cutter or tool is shorter, the pawl structures 5 can provide enough clamping power to keep the cutter or tool from skewing during high speed rotation in the machining process. However, if the cutter or tool is lengthy and the pawl structures 5 can clamp only a distal end thereof, a great portion of the cutter or tool is exposed outside the chucking apparatus. As the targeted object to receive machining usually is a hard article such as metal, and the driving spindle (not shown in the drawing) of the machining tool rotates at the high speed, with a great force applied to the cutter or tool, or the forcing angle being not vertical, the cutter or tool could be skewed. As a result machining precision suffers. It could even cause damage of the tool chucking apparatus or the machining tool and result in a great loss of cost.

SUMMARY OF THE INVENTION

The primary object of the present invention is to provide a tool chucking apparatus to enhance holding firmness of a cutter or tool on a machining tool during machining for a targeted metal to prevent suffering of precision and damage of the machining cutter or tool. To achieve the foregoing object the tool chucking apparatus of the invention includes a fastening member, a collet, a holding member and an extension member. The fastening member has a first housing space inside to hold the collet. The collet has a plurality of pawl structures which are spaced in an annular manner and formed in a conical structure. The pawl structures have a top end directing towards the fastening member. The extension member is located between the holding member and the fastening member, and includes a support portion and an anchor portion that are coupled together. The support portion and the fastening member are coupled through a first coupling portion. The support portion and the anchor portion are coupled respectively with the holding member through a second coupling portion and a third coupling portion. In addition, the fastening member has an annular fastening element. The collet has an annular groove corresponding to the annular fastening element that can be engaged to form a firm coupling between the collet and the fastening member such that the distal end of the collet has a sufficient clamping power. The first coupling portion and the second coupling portion are coupled at a juncture which has at least one through threaded passage formed thereon to receive at least one corresponding bolt to strengthen the coupling of the fastening member and the extension member. The fastening member, collet, holding member and extension member are hollow in the center and form an installation passage after assembly to hold a cutter or tool. Moreover, varying lengths and specifications of the support portion of the extension member may be selected according to the cutter or tool to be used.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
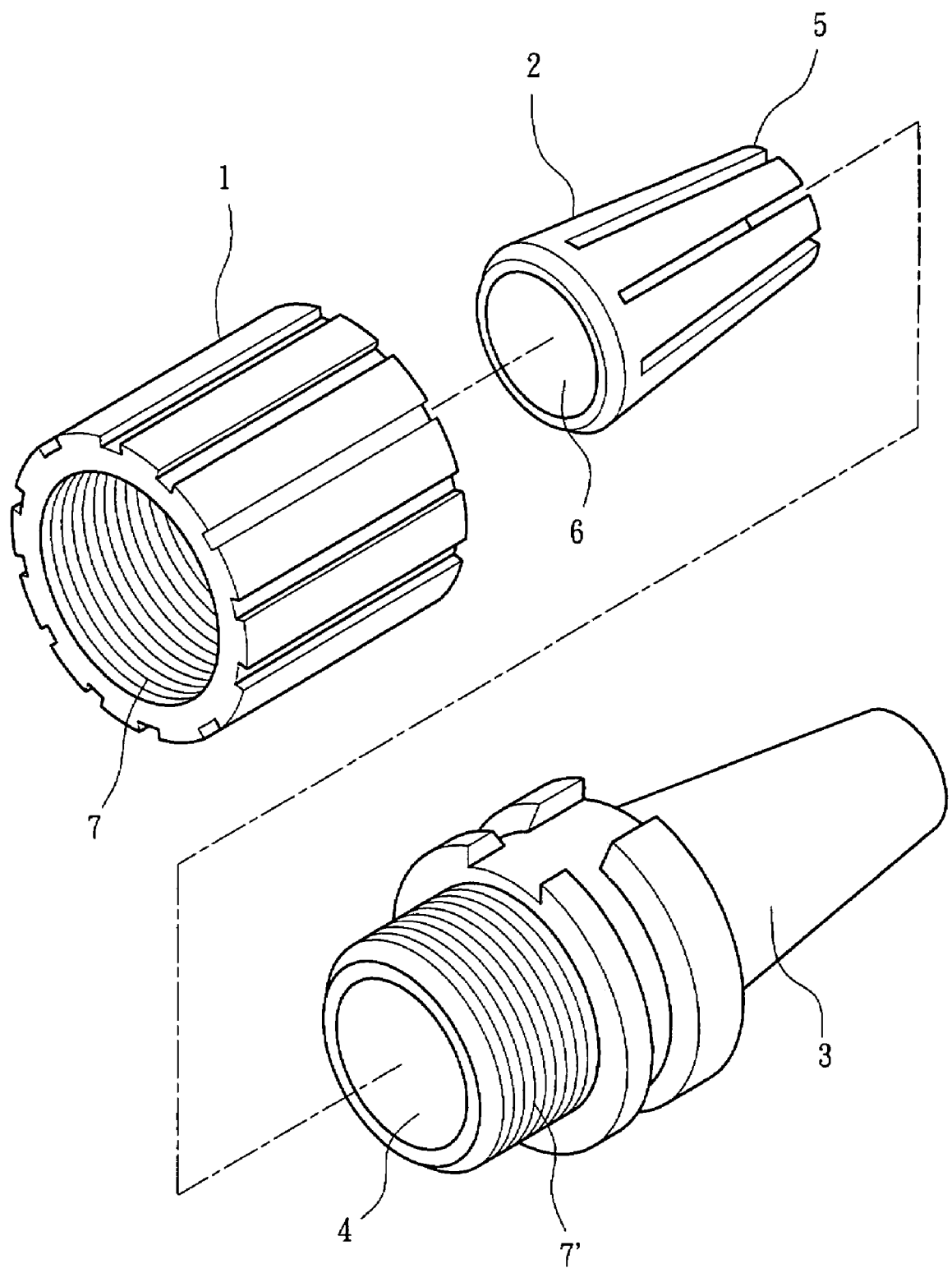
FIG. 1 is an exploded view of a conventional tool chucking apparatus.
Figure 2:
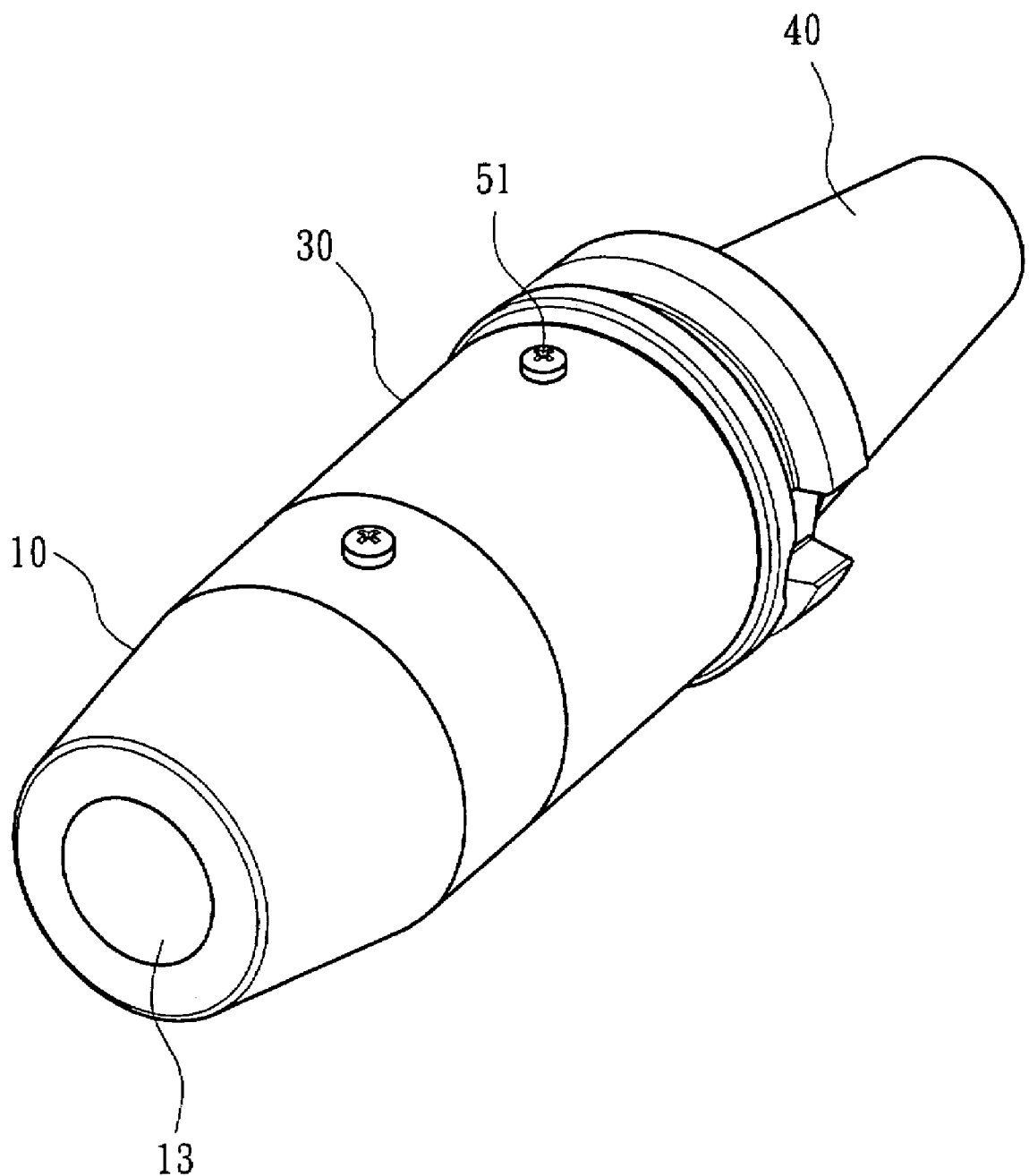
FIG. 2 is a perspective view of the tool chucking apparatus of the invention.
Figure 3:
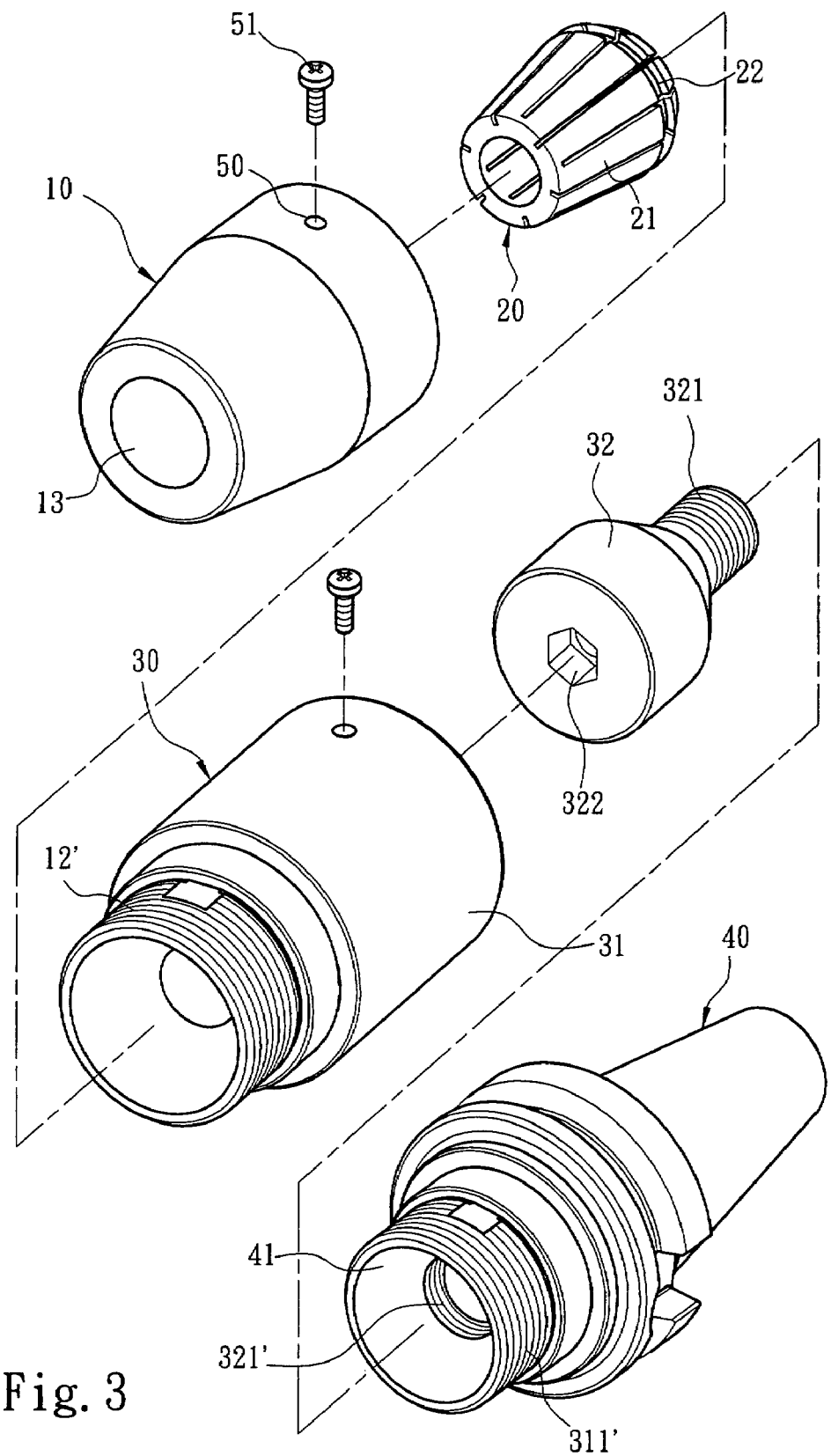
FIG. 3 is an exploded view of the tool chucking apparatus of the invention.
Figure 4:
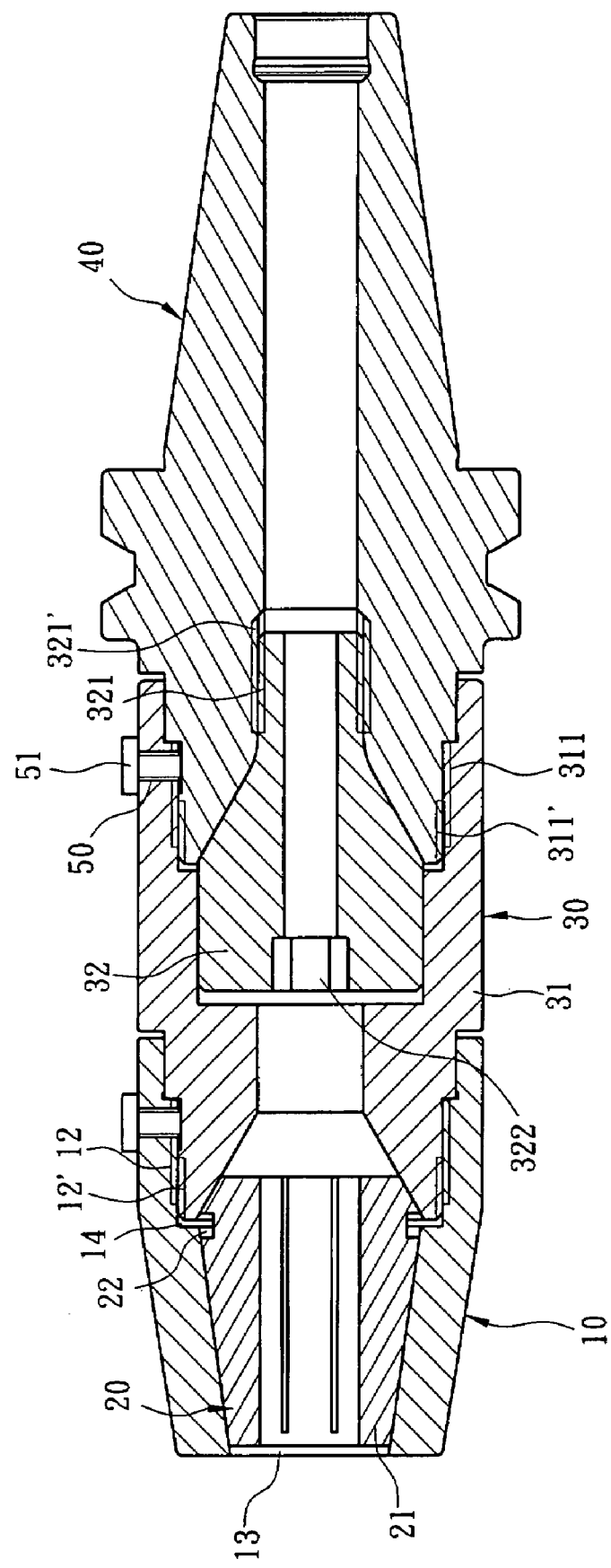
FIG. 4 is a sectional view of the tool chucking apparatus of the invention.

Please refer to FIGS. 2, 3 and 4, the tool chucking apparatus according to the invention aims to couple a machining tool (not shown in the drawings) with a machining cutter or tool (also not shown in the drawings), and to be connected to a driving spindle (not shown in the drawings) of the machining tool so that the machining tool can drive the cutter or tool held by the tool chucking apparatus to rotate at high speed to do machining on a targeted object (not shown in the drawings). The tool chucking apparatus of the invention includes a fastening member 10, a collet 20, an extension member 30 and a holding member 40. The fastening member 10 has a first housing space inside to hold the collet 20 in a tight manner. The collet 20 has a plurality of pawl structures 21 which are spaced from one another in an annular manner and formed in a conical structure. The extension member 30 is located between the holding member 40 and the fastening member 10, and includes a support portion 31 and an anchor portion 32 that are coupled together. The support portion 31 has one end coupled tightly with the fastening member 10 through corresponding first coupling portions 12 and 12', and coupled tightly with the holding portion 40 through corresponding second coupling portions 311 and 311'. The holding portion 40 has a second housing space 41 to hold the anchor portion 32. The anchor portion 32 is coupled with the holding portion 40 through third coupling portions 321 and 321'. As the anchor portion 32 is located in the second housing space 41 and more difficult to assemble, the anchor portion 32 has a drive feature 322 formed at one end to be coupled with the support portion 31 to engage with a desired tool (such as a hex wench, not shown in the drawings) to facilitate installation of the anchor portion 32 in the second housing space 41. The first coupling portions 12 and 12', second coupling portions 311 and 311' and third coupling portions 321 and 321' may be screwed together through corresponding screw threads. The first coupling portions 12 and 12', and the second coupling portions 311 and 311' have at least one through threaded passage 50 to receive at least one bolt 51 to increase coupling power of the fastening member 10 and the extension member 30, or the extension member 30 and the holding member 40. The fastening member 10, collet 20, holding member 40 and extension member 30 are hollow in the center to form an installation passage 13 after assembly to hold a cutter or tool.

The inserting cutter or tool is deeply held in the installation passage 13. It has a portion exposed outside the tool chucking apparatus that can be adjusted and anchored through the collet 20. The collet 20 is the main structure to hold the cutter or tool. The conical structure formed by the pawl structures 21 makes the collet 20 elastic. When the cutter or tool of varying specifications is inserted the pawl structures 21 can adjust the internal diameter thereof. After the collet 20 has been held in the holding member 40, and the fastening member 10 and the holding member 40 are coupled together, the pawl structures 21 are shrunk naturally inwards to clamp the cutter or tool to prevent the cutter or tool from loosening during machining at high rotation speed. The conical structure of the collet 20 has a top end directing towards the fastening member 10 to clamp the front end portion of the cutter or tool. While the front end of the cutter or tool is clamped tightly by the collet 20, only a small portion is exposed outside. Thus the impact of external forces decreases. As a result, the machining precision of the cutter or tool on the targeted object increases significantly. Moreover, to increase the clamping force of the bottom end of the collet 20 over the inserting cutter or tool, the fastening member 10 has an annular fastening element 14 while the collet 20 has a corresponding annular groove 22 to be wedged by the annular fastening element 14 to form a firm coupling between the collet 20 and the fastening member 10.

Figure 5:
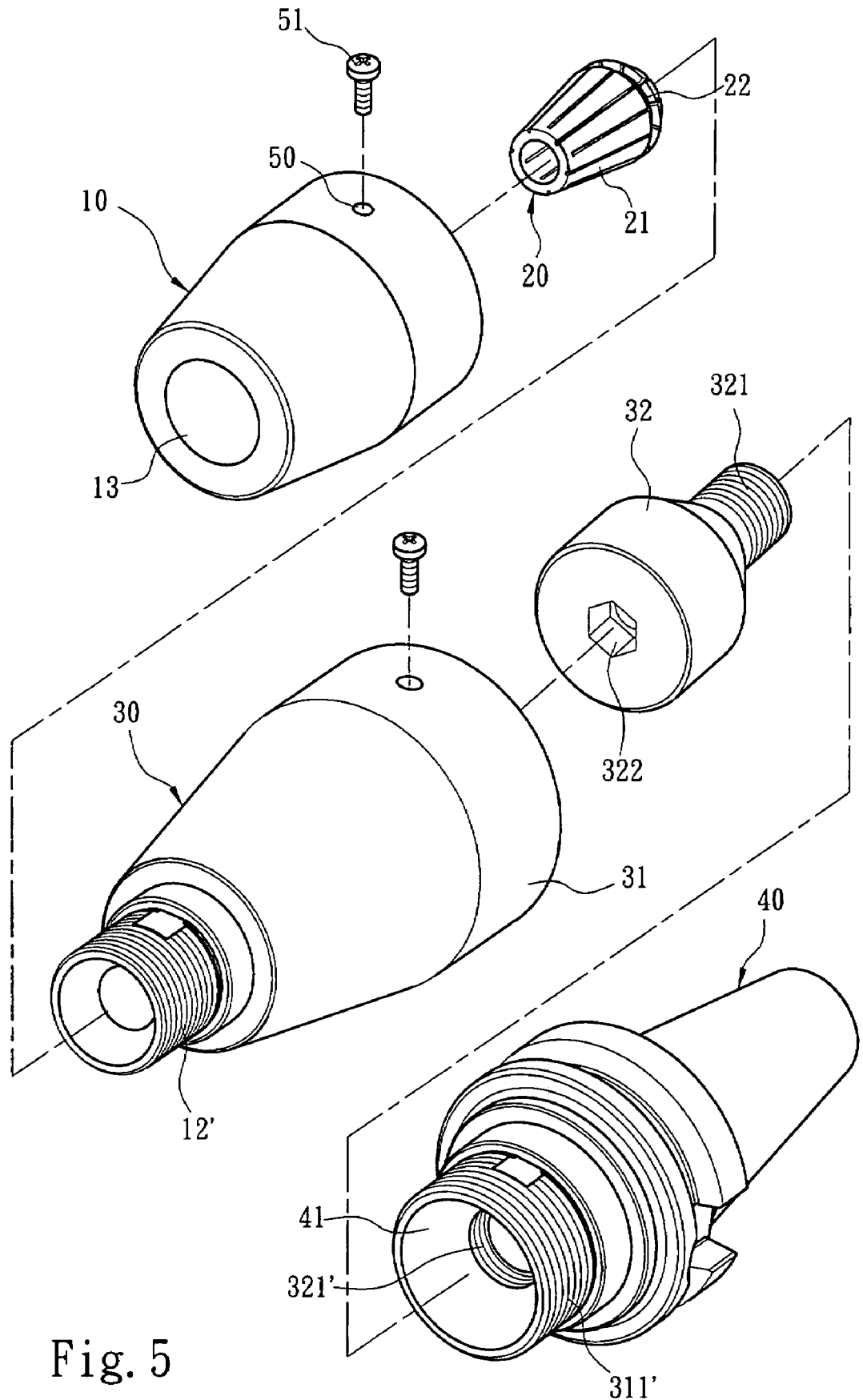
FIG. 5 is an exploded view of another embodiment of the tool chucking apparatus of the invention.
Figure 6:
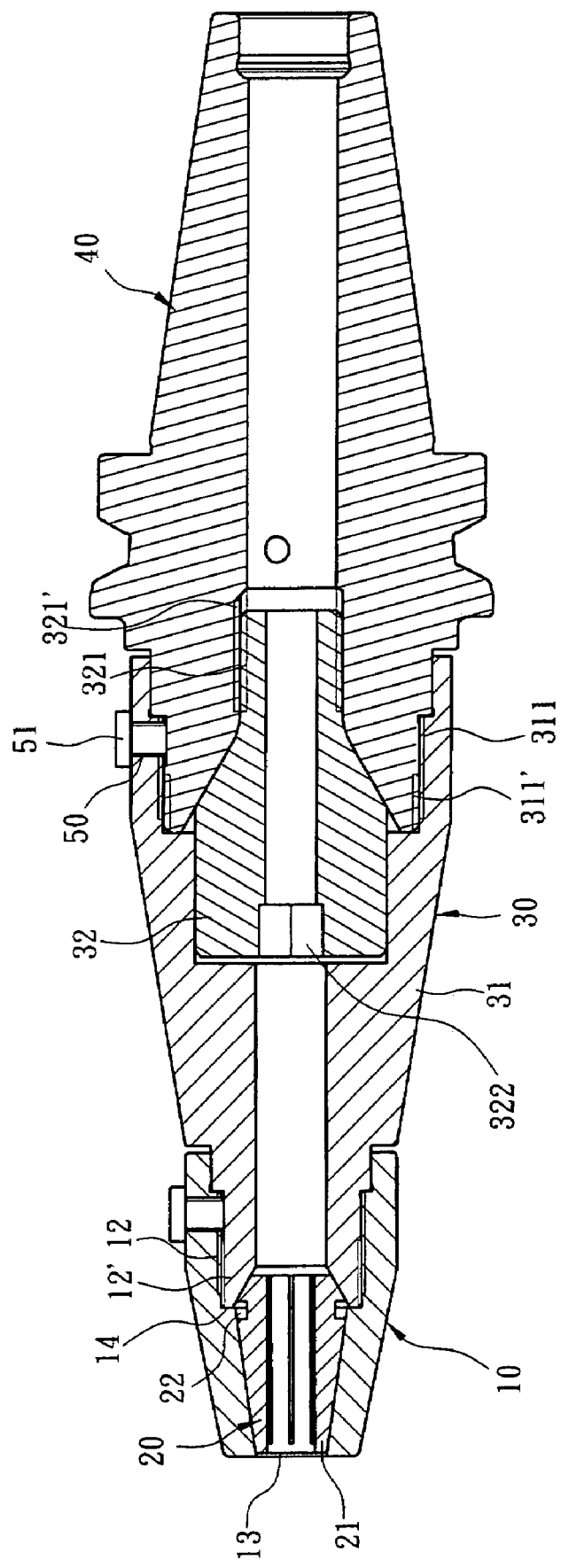
FIG. 6 is a sectional view of another embodiment of the tool chucking apparatus of the invention.

As the machining cutter or tool is not limited to one specification, aside from different sizes, the length could also be different. Although the holding position of the cutter or tool inserted into the installation passage 13 may be adjusted, to provide required firmness by the tool chucking apparatus for a special length specification of cutter or tool could be difficult. This could result in machining deviations. FIGS. 5 and 6 illustrate another embodiment of the invention. In this embodiment the support portion 31 is replaced by a longer specification. Hence a longer installation passage 13 is provided to hold a longer machining cutter or tool. The cutter or tool can be held in the installation passage 13 without restriction or exposing too much outside the tool chucking apparatus, machining precision at high speed rotation improves.

In response to the cutter or tool of varying length specifications, the support portion 31 may be replaced as desired. Such a design greatly improves applicability and convenience of the tool chucking apparatus. Moreover, the invention provides more strengthening designs that can enhance the firmness of the cutter or tool during machining at high speed rotation, and improve machining precision.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A tool chucking apparatus for holding a machining cutter or tool, comprising:
    a fastening member which has a first housing space inside;
    a collet which is held in the first housing space in a tight manner and has a plurality of pawl structures which are spaced in an annular manner and formed a conical structure;
    a holding member which has a second housing space inside; and
    an extension member which is located between the holding member and the fastening member and includes a support portion and an anchor portion separate from said support portion that are removably coupled together at an end of both portions; the support portion having another end coupling tightly with the collet and the fastening member; the anchor portion having another end held in the second housing space to form a tight coupling with the holding member; the support portion being replaceable with a desired length specification according to the cutter or tool being used;
    wherein the fastening member, the collet, the holding member and the extension member are hollow in the center thereof to form an installation passage after assembly to hold the cutter or tool;
    wherein the support portion of the extension member and the holding member are coupled through corresponding second coupling portions; and
    wherein the second coupling portions have at least one threaded passage to receive a corresponding bolt to enhance the coupling of the extension member and the holding member.

2. The tool chucking apparatus of claim 1, wherein a tip portion of the conical structure of the pawl structures is directed towards the fastening member.

3. The tool chucking apparatus of claim 1, wherein the fastening member and the support portion of the extension member are coupled together through corresponding first coupling portions.

4. The tool chucking apparatus of claim 3, wherein the first coupling portions have at least one threaded passage to receive at least one corresponding bolt to enhance the coupling of the fastening member and the extension member.

5. The tool chucking apparatus of claim 3, wherein the first coupling portions are screwed together through corresponding screw threads.

6. The tool chucking apparatus of claim 1, wherein the fastening member has an annular fastening element, the collet having an annular groove corresponding to and engageable with the annular fastening element to allow the collet to be firmly coupled with the fastening member.

7. The tool chucking apparatus of claim 1, wherein the second coupling portions are screwed together through corresponding screw threads.

8. A tool chucking apparatus for holding a machining cutter or tool, comprising:

a fastening member which has a first housing space inside;

a collet which is held in the first housing space in a tight manner and has a plurality of pawl structures which are spaced in an annular manner and formed a conical structure;

a holding member which has a second housing space inside; and an extension member which is located between the holding member and the fastening member and includes a support portion and an anchor portion separate from said support portion that are removably coupled together at an end of both portions; the support portion having another end coupling tightly with the collet and the fastening member, the anchor portion having another end held in the second housing space to form a tight coupling with the holding member; the support portion being replaceable with a desired length specification according to the cutter or tool being used;

wherein the fastening member, the collet, the holding member and the extension member are hollow in the center thereof to form an installation passage after assembly to hold the cutter or tool;

wherein the anchor portion and the holding member are coupled together through corresponding third coupling portions; and wherein the third coupling portions are screwed together through corresponding screw threads.

9. The tool chucking apparatus of claim 8, wherein the anchor portion has drive feature at one end coupling with the support portion to be engaged with a desired tool to facilitate installation of the anchor portion in the second housing space of the holding member.

* * * * *